US012715090B2

(12) United States Patent
Jackson et al.

(10) Patent No.: US 12,715,090 B2
(45) Date of Patent: Aug. 25, 2026

(54) ASSEMBLY AND METHOD FOR OPERATING ON HORIZONTALLY ORIENTED EQUIPMENT

(71) Applicant: Transportation IP Holdings, LLC, Norwalk, CT (US)

(72) Inventors: Corey Lee Jackson, Hummelstown, PA (US); Josh Allego, Erie, PA (US); Bernd Daeschner, Erie, PA (US); Jeffrey John Wolff, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 308 days.

(21) Appl. No.: 18/485,976

(22) Filed: Oct. 12, 2023

(65) Prior Publication Data

US 2024/0157528 A1 May 16, 2024

Related U.S. Application Data

(60) Provisional application No. 63/425,895, filed on Nov. 16, 2022.

(51) Int. Cl.
*B25B 27/06* (2006.01)

(52) U.S. Cl.
CPC .................................. *B25B 27/064* (2013.01)

(58) Field of Classification Search
CPC ... F16C 19/00; B66C 1/10; B66C 1/16; B23P 19/02; B25B 27/06; B25B 27/064; B25B 27/062
See application file for complete search history.

(56) References Cited

U.S. PATENT DOCUMENTS

| | | | | |
|---|---|---|---|---|
| 2,622,315 | A | 12/1952 | Loveland | |
| 5,167,057 | A | 12/1992 | Somerville | |
| 6,640,407 | B1 * | 11/2003 | Ou | B25B 27/064 29/252 |
| 10,532,450 | B2 | 1/2020 | Johansson et al. | |
| 2022/0388461 | A1 | 12/2022 | Kudo et al. | |

FOREIGN PATENT DOCUMENTS

| | | | |
|---|---|---|---|
| DE | 20211359 | U1 | 10/2002 |
| DE | 202008003668 | U1 | 8/2008 |
| DE | 20201105562 | A1 | 10/2011 |
| DE | 202020105975 | U1 | 1/2021 |
| EP | 2607021 | A1 | 6/2013 |
| EP | 3323553 | B1 | 2/2021 |

OTHER PUBLICATIONS

European Search Report dated Jun. 26, 2024 for corresponding European Patent Application No. 23205884.2.

* cited by examiner

*Primary Examiner* — Lee A Holly
(74) *Attorney, Agent, or Firm* — K&L Gates LLP

(57) ABSTRACT

Provided herein is a method that includes coupling a support fixture having a hanging strap to a frame of an assembly at a location vertically above a rotatable shaft of the assembly; vertically supporting the shaft with the strap; temporarily mounting a pulling fixture to the frame of the assembly, the pulling fixture having a bowl-shaped body and a hydraulic ram coupled to the bowl-shaped body, the pulling fixture mounted to the frame such that a second end of the bowl-shaped body is coupled to the frame and the hydraulic ram is operably coupled to a bearing of the assembly; and controlling the hydraulic ram to apply coaxial force to the bearing to remove the bearing from the assembly or to install the bearing into the assembly.

7 Claims, 12 Drawing Sheets

ASSEMBLY AND METHOD FOR OPERATING ON HORIZONTALLY ORIENTED EQUIPMENT

CROSS-REFERENCE TO RELATED APPLICATIONS

This application claims priority to U.S. Provisional Application No. 63/425,895 (filed 16 Nov. 2022), the entire disclosure of which is incorporated herein by reference.

BACKGROUND

Technical Field

The subject matter described herein relates to assemblies and methods that can assist in operating (e.g., replacing, inspecting, maintaining, and/or repairing) equipment that is horizontally oriented, such as, but not limited to, replacing an alternator bearing while the alternator remains horizontally oriented.

Discussion of Art

Some equipment can be heavy and difficult to maneuver during maintenance and/or repair operations on the equipment. For example, alternators onboard vehicles, such as mining vehicles, can be relatively large and difficult to maneuver. When an alternator requires inspection, repair, replacement, etc. (e.g., bearing replacement), there may be little room to work between the alternator and a prime mover that rotates the alternator (e.g., an engine). As a result, the alternator may require being removed from the vehicle, tilted to a vertical orientation (from the horizontal orientation that the alternator is in during operation onboard the vehicle), and then have the operations performed on the alternator. The alternator may then be re-assembled, rotated back to the horizontal orientation, and loaded back onto the vehicle. This process can take a considerable amount of time (e.g., several days of downtime) during which the vehicle is inoperable.

It may be desirable to have an assembly and method that differs from those that are currently available and that can speed up the time during which equipment can be operated on or serviced.

BRIEF DESCRIPTION

Provided herein is a method that includes coupling a support fixture having a hanging strap to a frame of an assembly at a location vertically above a rotatable shaft of the assembly; vertically supporting the shaft with the strap; temporarily mounting a pulling fixture to the frame of the assembly, the pulling fixture having a bowl-shaped body and a hydraulic ram coupled to the bowl-shaped body, the pulling fixture mounted to the frame such that a second end of the bowl-shaped body is coupled to the frame and the hydraulic ram is operably coupled to a bearing of the assembly; and controlling the hydraulic ram to apply coaxial force to the bearing to remove the bearing from the assembly or to install the bearing into the assembly.

Provided herein is a support fixture for assembly of equipment having a horizontally arranged shaft disposed for rotation within a frame of a vehicle, the support fixture includes a rectangular base having a length and a width, wherein the length is sized proportional to a diameter of the shaft, and wherein the width is sized proportional to a width of the frame; a first mounting bracket located at one end of the rectangular base; and an eyebolt mounted at an opposite of the rectangular based, wherein the eyebolt is threaded into the rectangular base.

Provided herein is a pulling fixture for assembly of equipment having a horizontally arranged shaft disposed for rotation within a frame of a vehicle, the shaft supported in the frame on a bearing, the pulling fixture includes a bowl-shaped body having a flanged end and an opening opposite the flanged end; and a hydraulic ram coupled to the opening and aligned coaxially with the bowl-shaped body.

Provided herein is a pressing fixture assembly for assembly of equipment having a horizontally arranged shaft disposed for rotation within a frame of a vehicle, the shaft supported in the frame on a bearing, the pressing fixture assembly including a press ring operably coupled to the frame; a press plate operably coupled to the bearing, the press plate positioned radially inward of the press ring; and a pressing fixture having a hydraulic ram and a plurality of arms extending from a hub coupled to the hydraulic ram.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
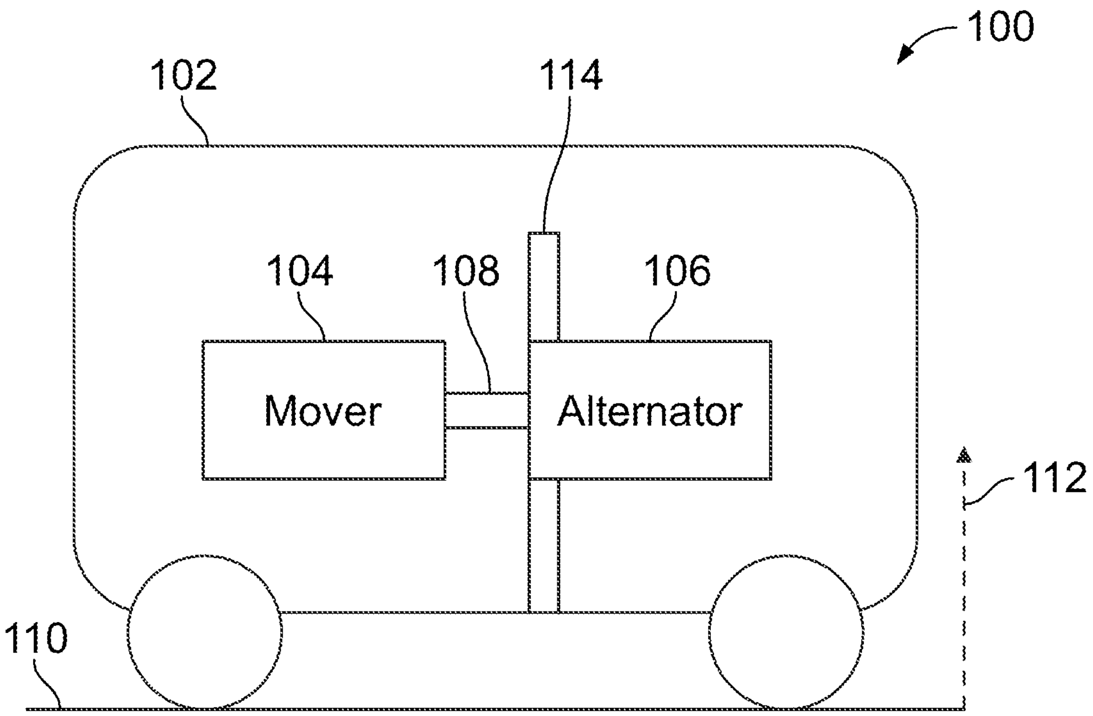
FIG. 1 is a diagram of a powered system having a horizontally mounted prime mover and alternator.

Embodiments of the subject matter described herein relate to assemblies and methods that can allow for equipment to be serviced (e.g., inspected, repaired, replaced, maintained, etc.) without having to remove the equipment from a larger powered system in or on which the equipment is disposed and/or without having to change an orientation of the equipment. As described herein, several assemblies have been developed that may assist in disassembling equipment onboard a vehicle, servicing the equipment, and assembling the equipment, all without having to remove or reorient the equipment relative to the vehicle. While one or more examples described herein relate to servicing of an alternator onboard a mining vehicle (e.g., for replacing a bearing of the alternator), not all embodiments of the inventive subject matter are limited to alternators or mining vehicles. The assemblies and methods described herein may be used to service other equipment that may be stationary (e.g., a stationary alternator or other power generating device), may be onboard another type of vehicle (e.g., an automobile, a rail vehicle, a marine vessel, an aircraft, an agricultural vehicle, etc.), and/or may be another type of equipment (e.g., not an alternator) but that may require support for alignment during disassembly and/or assembly of the equipment.

One or more examples of the assemblies described herein may include a support fixture assembly that can interface to a static structure of the equipment above an elongated horizontally oriented body such as an alternator rotor shaft. The support fixture assembly can include a fixture body above the equipment and have a hoisting body (e.g., a nylon hoisting strap or other body) that may be attached and slung under the elongated, horizontally oriented body to apply support to the elongated, horizontally oriented body (e.g., the rotor shaft). This can help prevent a rotor of the alternator from dropping on a stator of the alternator and causing damage when the support bearing is disassembled. The assembly also can allow for fine-adjustment of the location of the elongated, horizontally oriented body while assembly of the equipment (e.g., the bearing) is performed.

Another assembly may include a pulling fixture assembly that can interface with components installed on the elongated, horizontally oriented body (e.g., the rotor shaft), such as an outboard sleeve, bearing, and/or bearing housing). The pulling fixture assembly can have a threaded interface with which a ram device (e.g., a hydraulic ram device) is assembled and activated. The pulling fixture assembly may be stout and rigid to keep parts aligned during disassembly, thereby preventing damage to the elongated, horizontally oriented body from scoring or gouging. In some embodiments, the pulling fixture may be a bowl-shaped body having a flanged end adapted to mate or fasten to one end of an alternator frame and an inner cavity adapted to surround protruding components of the alternator such as an alternator shaft, a power-take-off hub, or a bearing retainer. The pulling fixture may be provided with an opening opposite the flanged end, the opening sized and adapted to couple to a portion of the ram and provide a path for a ram plunger.

Another assembly may include a press fixture assembly that can interface with static structure of the equipment as a reaction load path. The press fixture assembly can have a threaded interface with which the ram device can be assembled and activated. The press fixture assembly may be stout and rigid to keep parts aligned during assembly, which prevents damage to the elongated, horizontally oriented body from scoring or gouging. In one embodiment, the press fixture may be sized to interface with both races of an alternator bearing and an alternator bearing cap.

The assemblies and methods described herein may be used to disassemble and assemble equipment without heating parts of the equipment. For example, the assemblies and methods may keep parts aligned so that an alternator bearing does not require heating to be placed over a shaft, which is common for servicing some alternator bearing assemblies. In some embodiments, heating parts of the equipment is desirable, and the pulling fixture and the pressing fixture is provided with openings to provide access to alternator components for temperature measurement with thermocouple devices or access to alternator components for coupling to induction heating devices or similar.

FIG. 1 illustrates one example of a powered system 100 having equipment 102 that may be serviced or operated on using one or more embodiments of the assemblies and methods described herein. The powered system may be a vehicle having a prime mover 104 and a power generating device 106. The prime mover can represent an engine and the power generating device can represent an alternator or generator in one example. The vehicle may be a mining vehicle, or may be a rail vehicle (e.g., a locomotive), an automobile, an agricultural vehicle, or the like. The prime mover and power generating device are connected by an elongated shaft 108. The engine rotates the shaft to cause the alternator or generator to create electric current. This current may be used to power one or more loads of the vehicle (e.g., traction motors, auxiliary loads, etc.).

The alternator is shown in a horizontal position or orientation in FIG. 1. For example, the shaft that rotates in the alternator may be horizontal relative to a surface 110 on which the vehicle travels. Some currently known assemblies and methods for operating on equipment such as an alternator may require detaching the alternator from the engine, removing the alternator from the vehicle, tilting the alternator to a vertical position 112, taking the alternator apart in the vertical position, servicing the alternator (e.g., replacing bearings), moving the alternator back to the horizontal position, placing the alternator back on the vehicle, and then reconnecting the alternator with the prime mover. In some embodiments, the alternator is supported in the vehicle by a frame structure 114.

Figure 2:
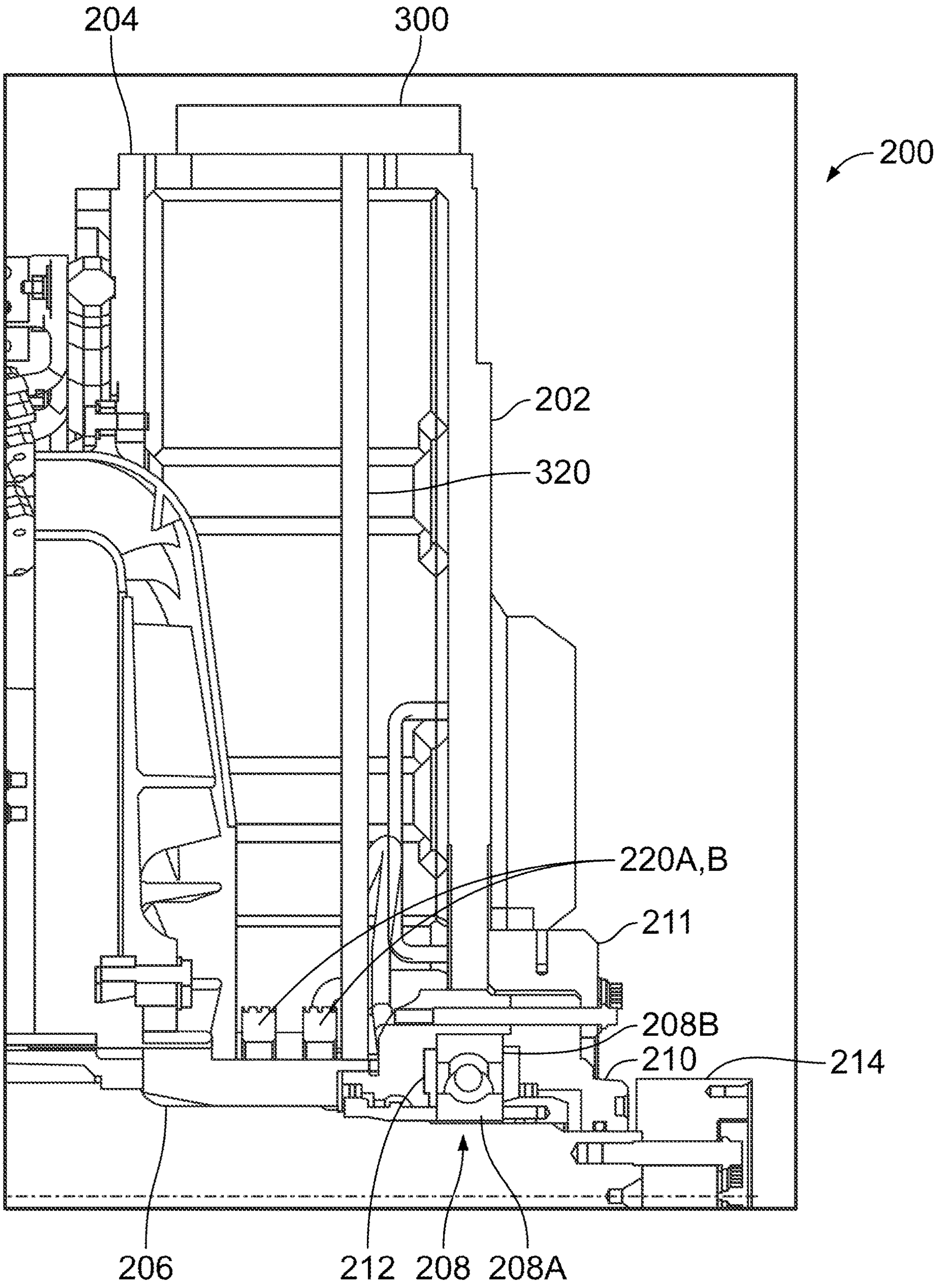
FIG. 2 is a partial cross-sectional view of a vehicle having a horizontally arranged alternator.

Referring now to FIG. 2, in one embodiment a vehicle 200 is provided with a front frame 202 and a rear frame 204 configured to operably support a shaft 206. For description purposes, the shaft may be arranged in a substantially horizontal orientation and defines a longitudinal axis used herein with reference to terms “axial”, “axially”, “coaxial”, and “coaxially.” The shaft can be supported on a bearing 208 having an inner bearing race 208A and an outer bearing race 208B. In some embodiments, the bearing may be retained axially on the shaft 206 by a bearing cap 210 and a bearing housing 212. The bearing housing can be adapted to be received in the front frame and coupled to the bearing cap with appropriately sized fasteners. In one embodiment, a clamp plate 211 may couple the bearing cap to the front frame. In some embodiments, a power-take-off (PTO) hub 214 can be coupled to a first end of the shaft. The PTO hub may be accessible from one side of the front frame.

Figure 3:
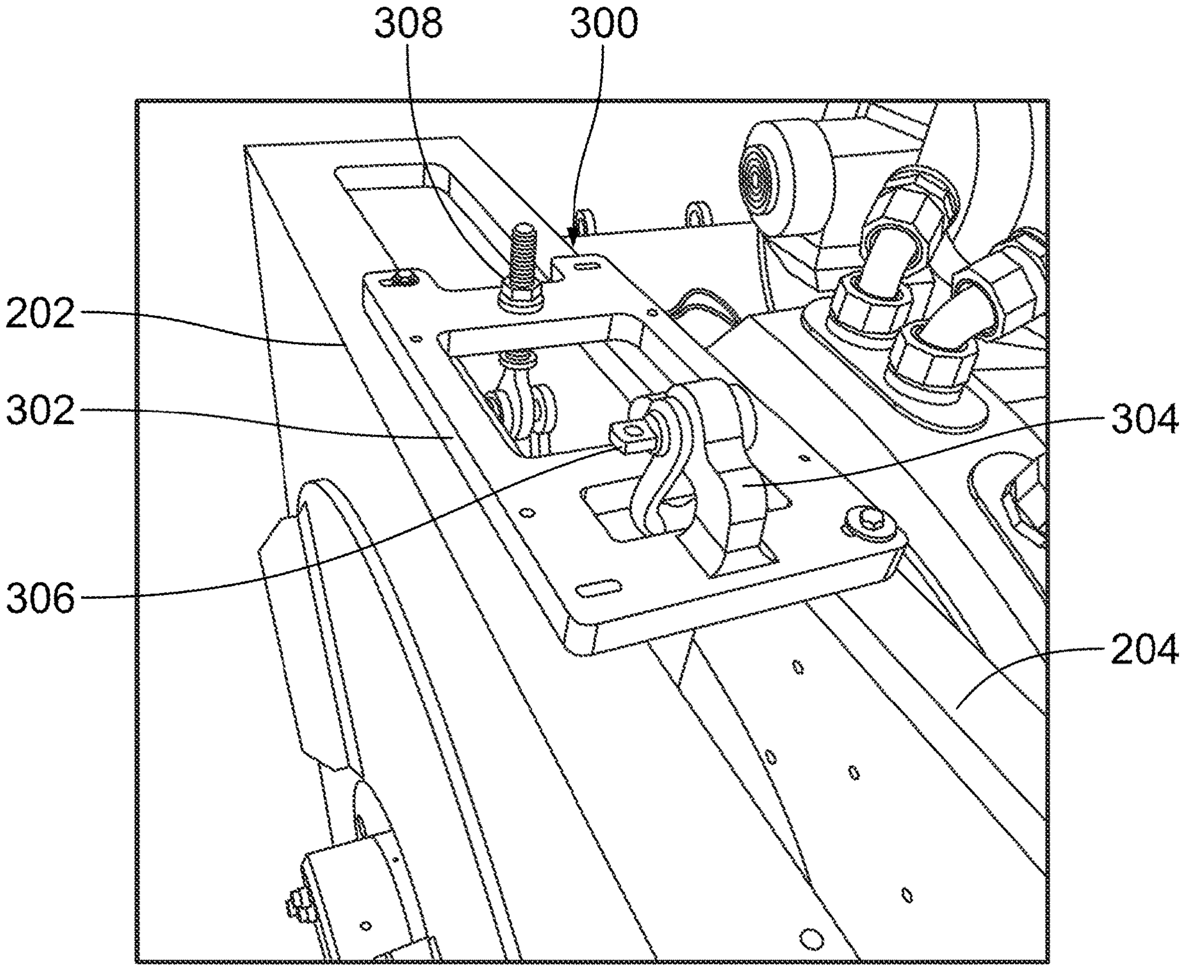
FIG. 3 is a perspective view of a front frame and rear frame of the vehicle of FIG. 2.

Referring now to FIGS. 2 and 3, in one embodiment, the front frame and the rear frame may be parallel or substantially parallel to one another and form an opening between the front frame and the rear frame. In some embodiments, the front frame and the rear frame can be an integral structure forming an internal cavity. The front frame and rear frame may be provided with passages such as through bores or holes adapted to provide coupling to vehicle equipment. The shaft may pass through the front frame and the rear frame.

A support fixture 300 can couple to the front frame and the rear frame and align vertically above the shaft. The support fixture can have a rectangular base 302 that is sized to sturdily mount on the front frame and the rear frame. The support structure may be provided with a first mounting bracket 304 located at a first end of the rectangular base. The first mounting bracket can receive and support a shackle 306. The support structure may be provided with a second mounting location at a second end of the rectangular base. The second mounting location can support and receive an eyebolt 308. The eyebolt can be provided with a threaded shank that is coupled in the rectangular base. The eyebolt can thereby be adjusted with respect to the rectangular base.

The support fixture may be coupled to a strap 320. The strap can be a flexible nylon strap, for example, as is commonly used in hoisting heavy objects. A first end of the strap can be securely attached to the shackle and a second end of the strap can be securely attached to the eyebolt. A middle portion of the strap may be positioned to thereby cradle and axially support the shaft. In some embodiments, the strap can couple to the shaft at a location in proximity to a set of collector rings 220A and 220B disposed on the shaft. The collector rings may be delicate or otherwise sensitive to load or force in a vertical direction, therefore care in positioning the strap to avoid damage to the collector rings may be preferred.

In some embodiment, the support fixture and the strap can be positioned on the front frame and rear frame when it is time to service the bearing. The support fixture and the strap may be removed from the front frame and the rear frame when the service procedures have concluded. In some embodiments, the support fixture can be provided with additional support surfaces and/or brackets to suspend an overhead hoist or crane in proximity to the front frame.

Figure 4:
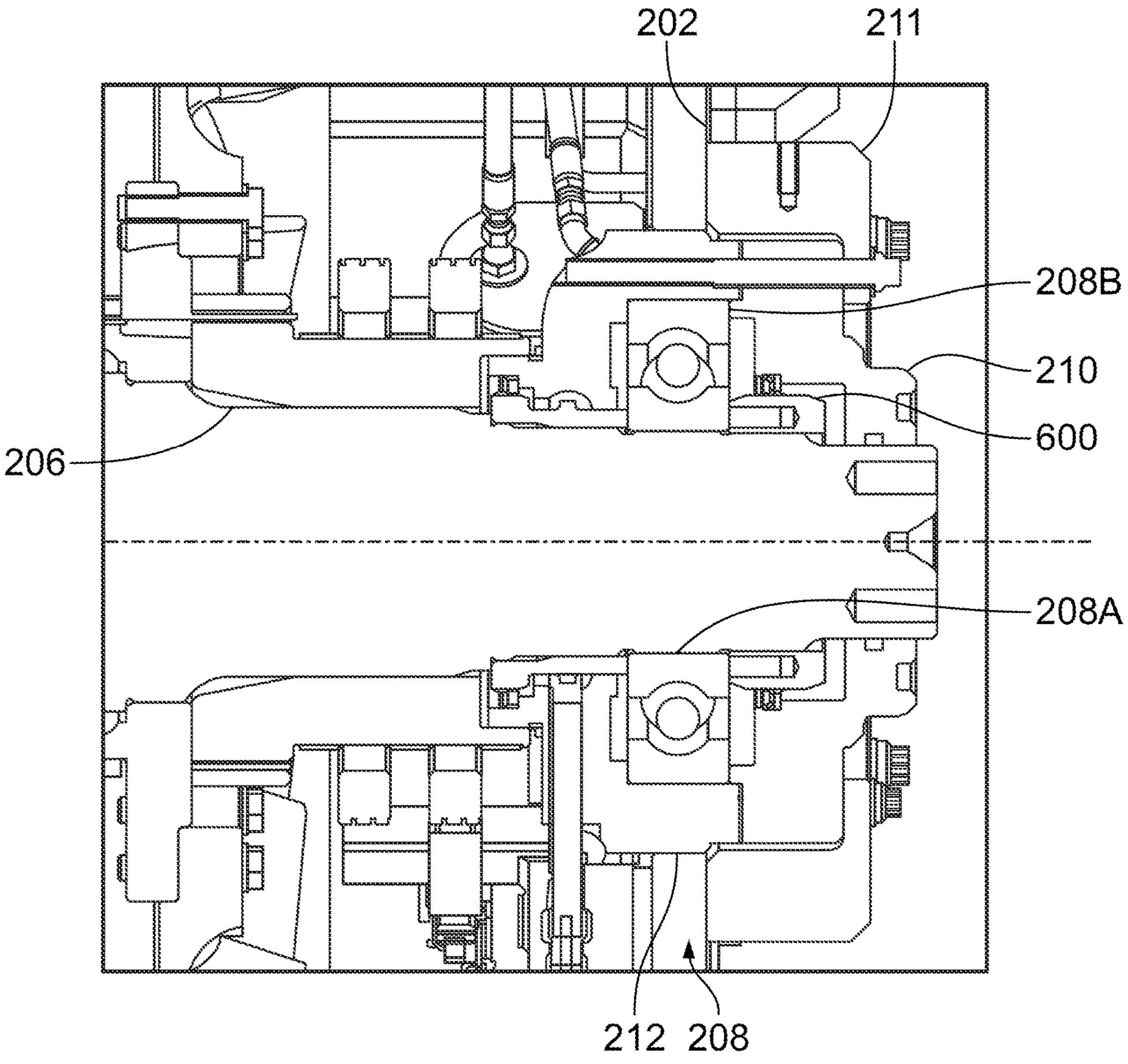
FIG. 4 is a cross-sectional view of a bearing and shaft provided in vehicle of FIG. 2.

Referring now to FIGS. 4-8, a method to remove the bearing while maintaining a horizontal orientation of the shaft will be described herein. It is understood that the removal of shrouds, covers, hoses, electrical cables, and other components may be necessary to position the support fixture and the strap to the front frame and the rear frame and cradle the shaft. FIG. 4 illustrates portions of the vehicle in proximity to the shaft and the bearing. The PTO hub can be removed from the shaft prior to the placement of the strap or after the placement of the strap. The strap may be positioned to support the shaft before the removal of the clamp plate from the front frame.

Figure 5:
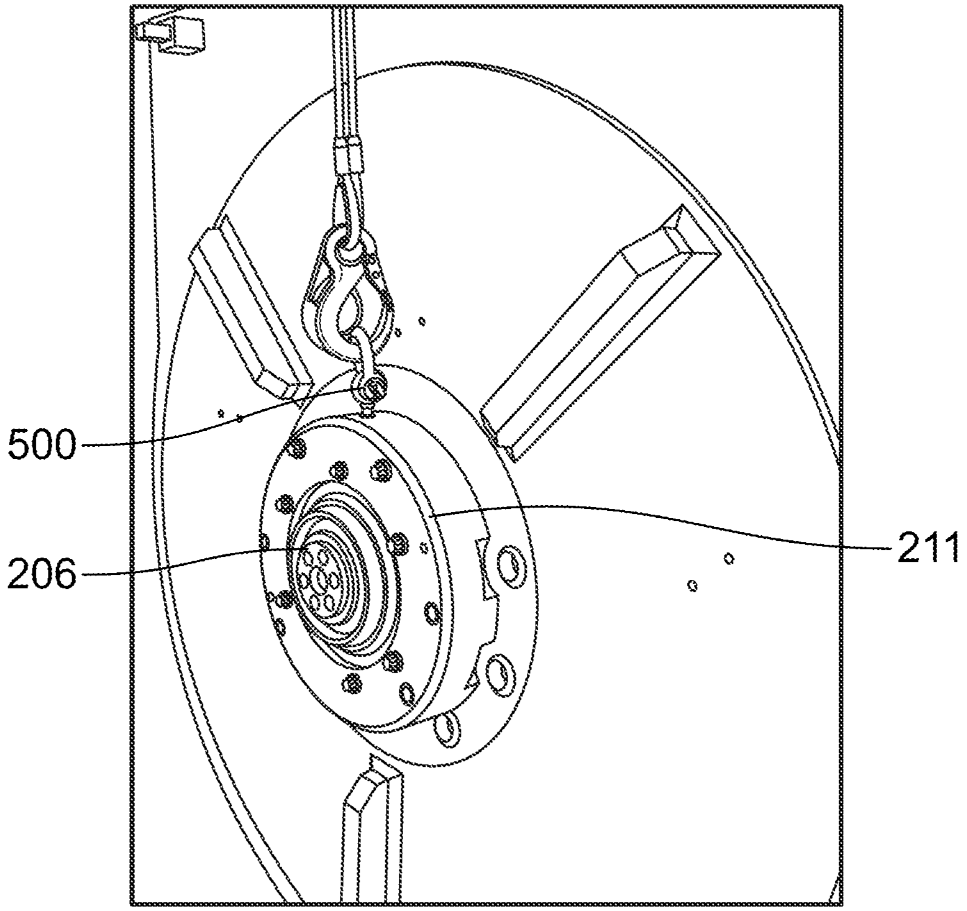
FIG. 5 is an isometric view of the front frame of FIG. 3.

In some embodiments, as is depicted in FIG. 5, a hoist coupling 500 can be secured to the clamp plate to assist in safe removal of the clamp plate from the front frame. Removal of the clamp plate reveals the bearing, the bearing cap, and the bearing housing.

Figure 6:
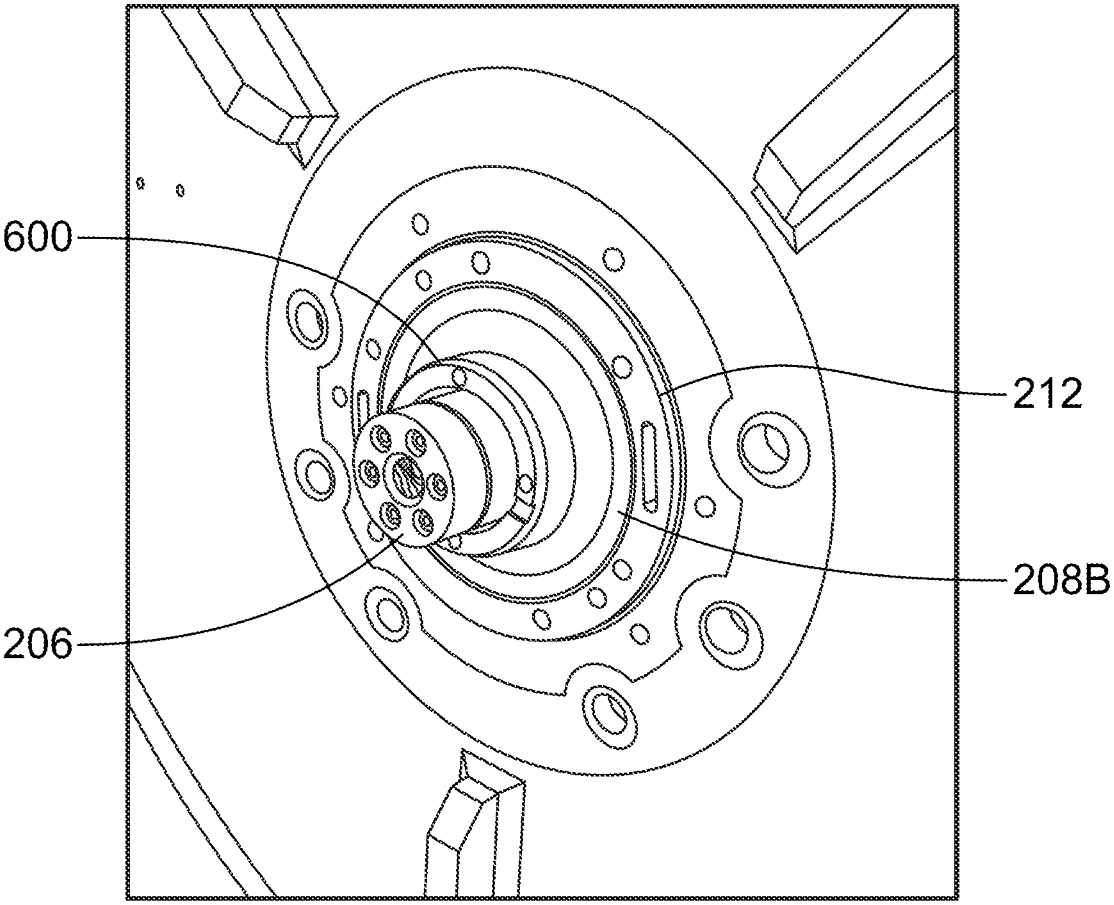
FIG. 6 is a perspective view of the front frame of FIG. 5 with certain components removed.

Turning now to FIG. 6, the removal of the bearing cap from the bearing and the shaft reveals the bearing housing and a bearing sleeve 600. Measurements may be taken of the relative position of the bearing sleeve with respect to a front face of the shaft to assess concentricity and alignment of the bearing with respect to the shaft. The bearing sleeve can be a ring that is lightly press fit onto the shaft and configured to axially retain the inner bearing race.

Figure 7:
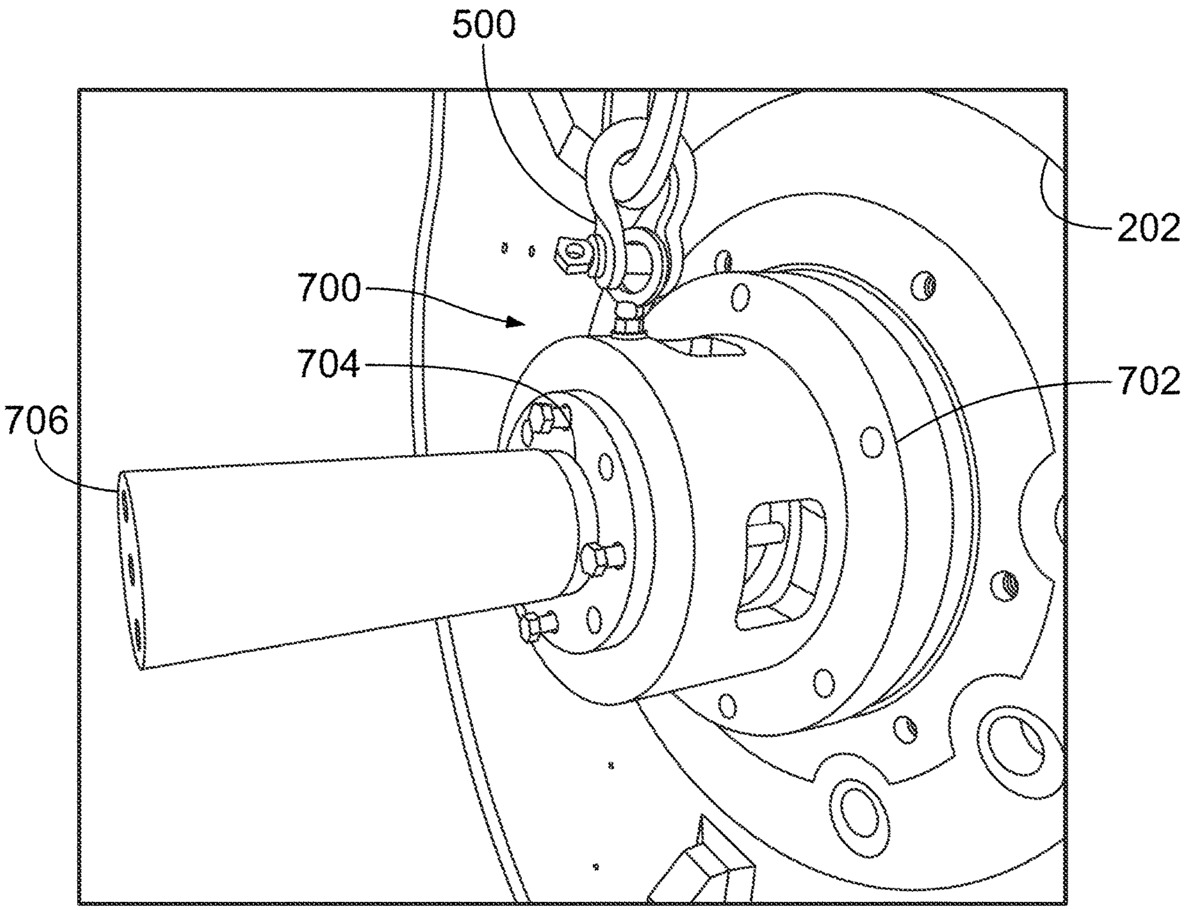
FIG. 7 is a perspective view of a pulling fixture mounted to the front frame of FIG. 5.

FIG. 7 illustrates a pulling fixture 700 coupled to the bearing housing. In one embodiment, a pulling fixture 700 can be a bowl-shaped body having a flanged end 702 and an opening 704. The flanged end can be configured to couple to a portion of the front frame. The flanged end may be configured to couple to a portion of the bearing housing. The opening can be adapted to receive a hydraulic ram 706. The hydraulic ram can be an Enerpac RC-256 or RC 254, for example. In some embodiments, the hydraulic ram can be threaded into the opening. As is understood in the art, the hydraulic ram has a body and a piston, whereby the piston can move with respect to the body under the influence of controlled hydraulic pressure.

Referring again to FIG. 6, the pulling fixture can be used to remove the bearing sleeve by aligning the pulling fixture coaxially with the shaft and coupling the flanged end to the bearing housing. The piston of the hydraulic ram may apply force to the end of the shaft. Control of hydraulic pressure in the hydraulic ram can be used to pull the bearing sleeve from the shaft. With the bearing sleeve removed, measurements of the radial and axial position of the inner bearing race with respect to the front face of the shaft can be recorded.

Before the pulling fixture is used to pull the bearing, the strap may be adjusted using the eyebolt. Adjustments to the strap can be made to ensure axial support of the shaft. The pulling fixture can be used to pull the bearing housing and the bearing from the shaft. As is depicted in FIG. 7, the hydraulic ram and the pulling fixture may be mounted coaxially with the shaft. In some embodiments, it may be preferred to support the pulling fixture with the hoist coupling.

Figure 8:
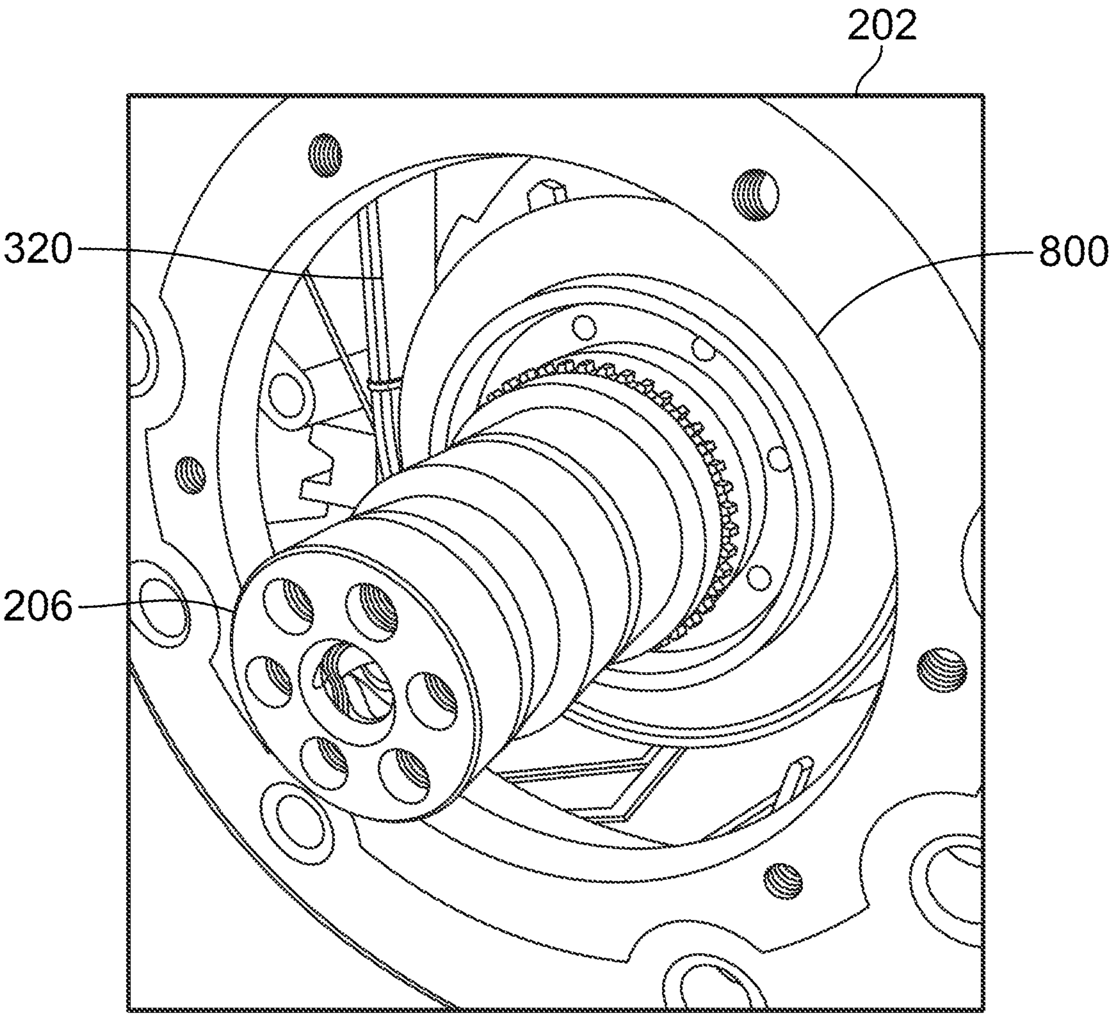
FIG. 8 a perspective view of the front frame of FIG. 5 with a bearing removed.

FIG. 8 illustrates the front frame upon removal of the bearing and bearing housing. With the bearing decoupled from the shaft, the strap can support the axial location of the shaft. The front frame may be provided with an opening 800. The opening can be adapted to receive and support the bearing housing. Measurements of the radial position of the shaft with respect to the opening may be taken and recorded to assess alignment of the shaft.

Figure 9:
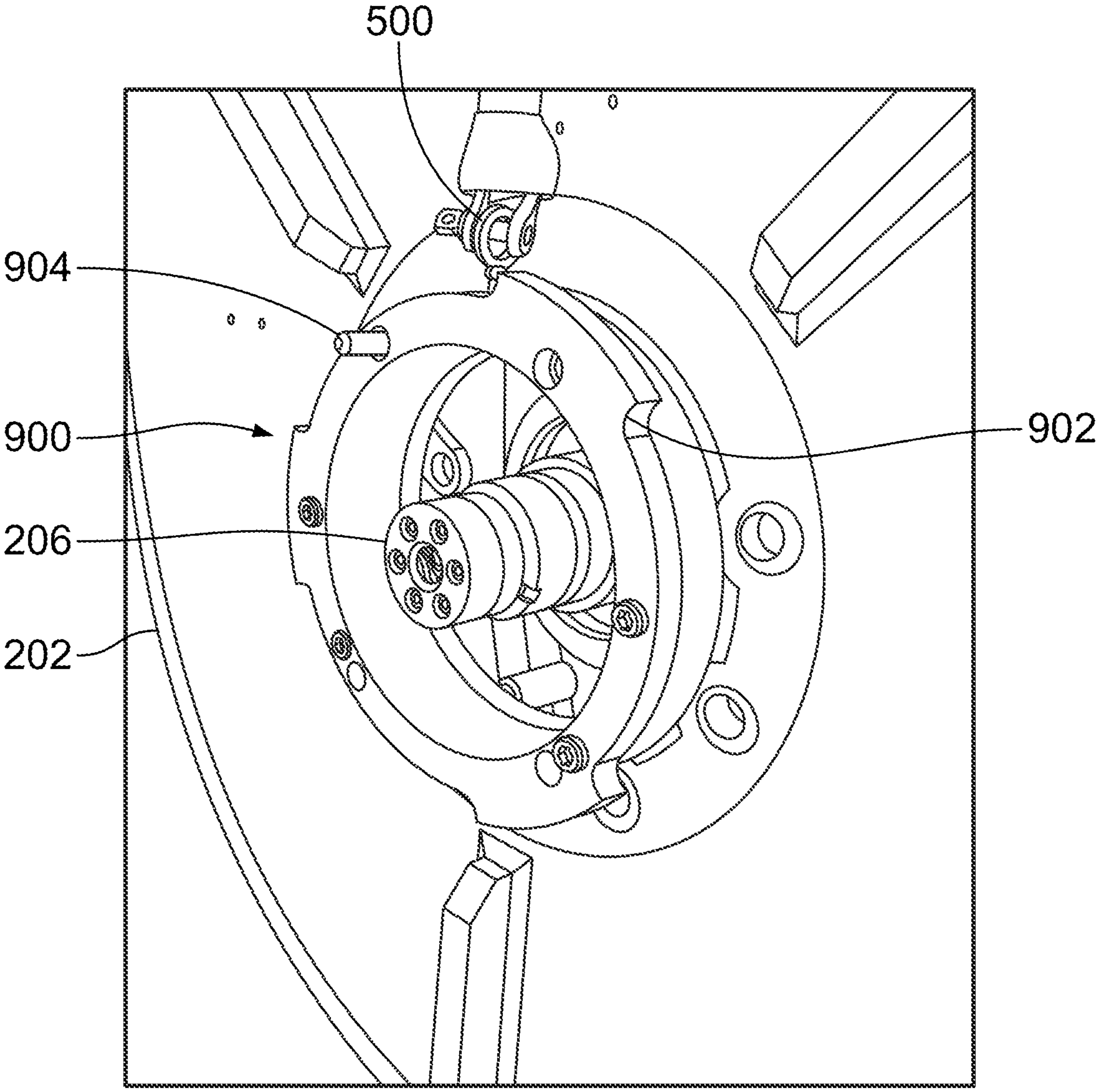
FIG. 9 is perspective view of a press ring mounted to the front frame.
Figure 10:
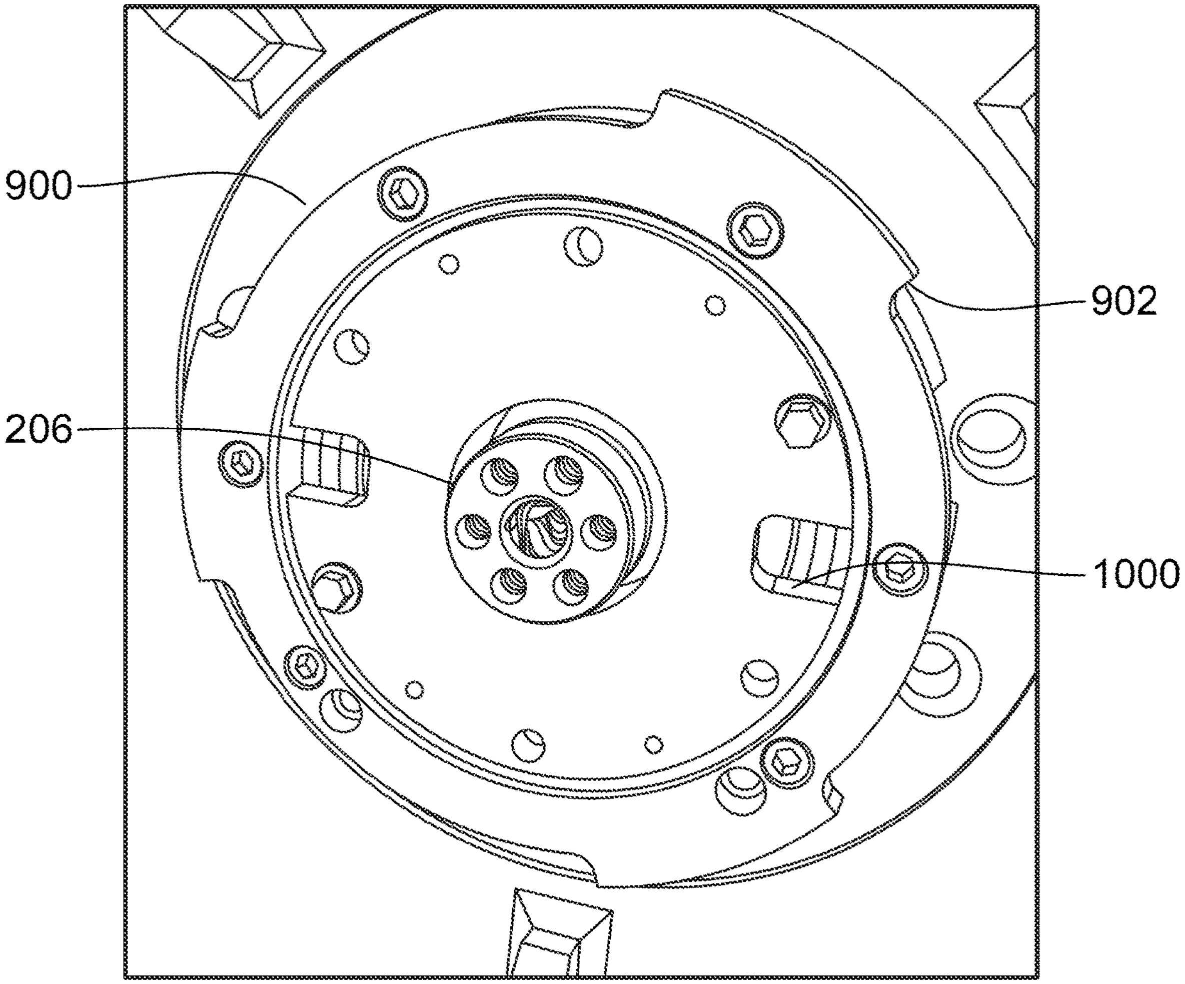
FIG. 10 is a perspective view of a press plate and the press ring.
Figure 11:
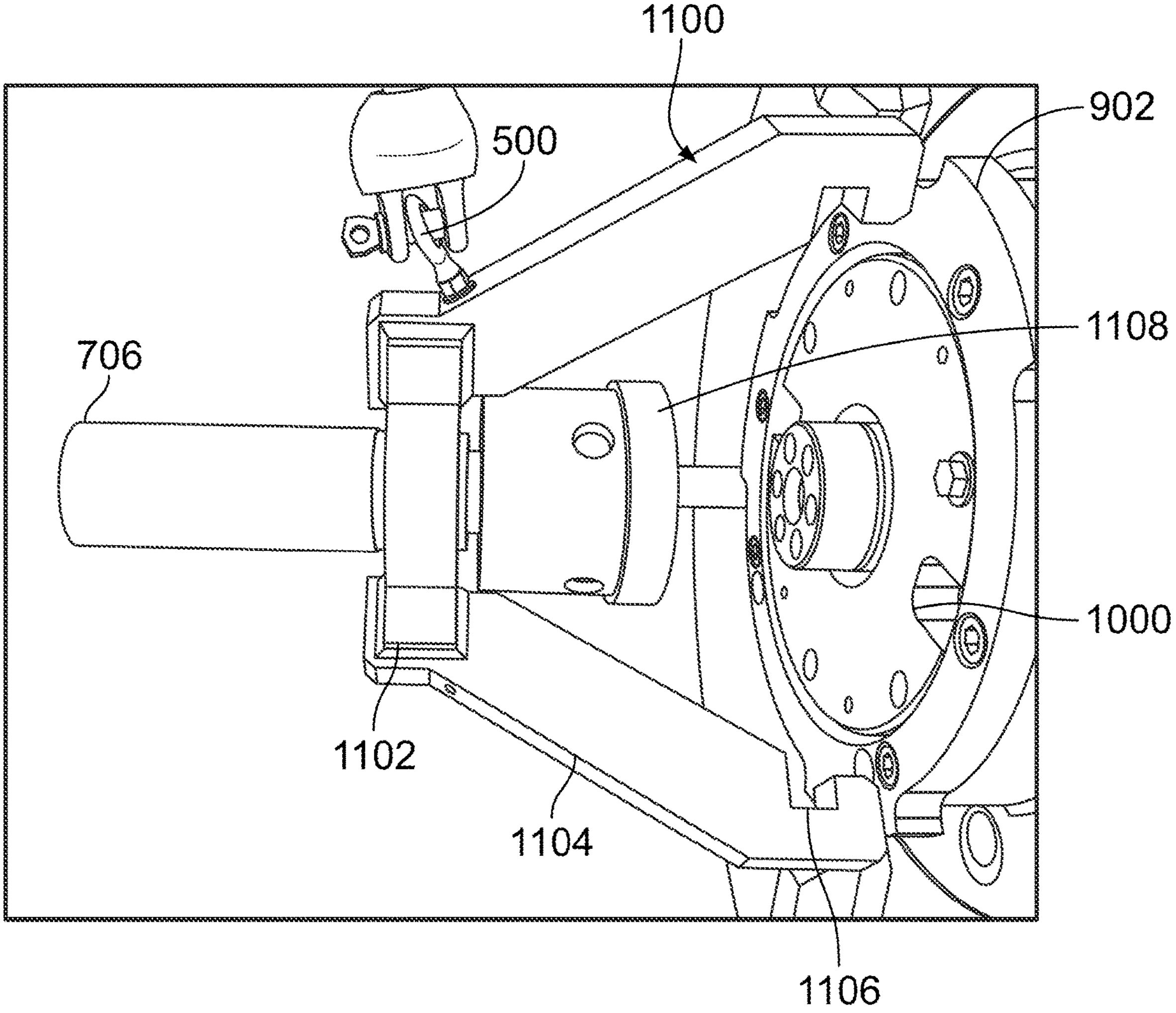
FIG. 11 is a perspective view of a press fixture and the press ring.

Referring now to FIGS. 9-11, a method to install the bearing while maintaining a horizontal orientation of the shaft will be described herein. In one embodiment, a reaction ring 900 can be mounted to the front frame. The reaction ring can be a generally annular body having an inner bore sized appropriately with respect to the opening. The reaction ring may be provided with an array of extensions 902 arranged radially about the outer periphery of the annular body. In some embodiments, there are two or more extensions provided on the reaction ring. The hoist coupling may be used to assist in the mounting of the reaction ring to the front frame.

Turning now to FIG. 10, a press plate 1000 can be a generally cylindrical plate with holes and openings adapted to receive and support fasteners. The press plate may have an outer diameter sized to provide sufficient clearance to the inner bore of the reaction ring. The press plate can be provided with an inner bore sized to provided clearance to the shaft. The press plate can be coupled to the bearing housing to facilitate the installation of the bearing housing and a new or refurbished bearing. The press plate can have a face adapted to couple to the inner bearing race, outer bearing race, and the bearing housing. It should be appreciated that the installation of the bearing housing and the bearing may require force. In some embodiments, heat may be used to momentarily change the size of certain components of the assembly to facilitate coupling. The press plate can be positioned coaxial with the shaft and inside of the press ring.

Referring now to FIG. 11, in one embodiment, a pressing fixture 1100 can be configured to couple to the extensions and the shaft. The pressing fixture may be provided with a hub 1102 coupled to the hydraulic ram. An array of arms 1104 can extend axially and radially away from the hub. Each arm may be provided with a slot 1106. The slot can be adapted to interlock with the extension to thereby provide a means for axial reaction of force generated by the hydraulic ram. The pressing fixture can couple to the hoist coupling to ease the axial and radial positioning of the pressing fixture with respect to the press ring.

In one embodiment, the pressing fixture may include a pressing cylinder 1108 coupled to the piston of the hydraulic ram. The pressing cylinder can have an inner bore sized to provide clearance to the shaft. The pressing cylinder may be configured to axially translate with the plunger of the hydraulic ram under the influence of hydraulic pressure. The pressing cylinder can be in contact with a second face of the press ring. During installation of the bearing and the bearing housing, the pressing fixture can be securely coupled to the reaction ring. Controlled hydraulic pressure in the hydraulic ram can urge the pressing cylinder axially and thereby displace the press plate in the axial direction. The press plate can distribute the pressing force generated from the hydraulic ram equally to the inner bearing race, the outer bearing race, and the bearing housing. The pressing force may be sufficient to overcome the friction generated by the sliding of the bearing housing into the opening and the onto the shaft. The bearing sleeve can be installed onto the shaft using the pressing fixture. The bearing sleeve may be heated by means of induction heater, for example, prior to placement on the shaft.

The assemblies and devices described herein are provided to facilitate efficient removal and installation of components mounted in machinery in a horizontal orientation. In reference to FIGS. 1-11 and FIG. 12, a method to replace a bearing, for example the bearing, using the support fixture, the pulling fixture, the reaction ring, the press plate, and the pressing fixture will be described.

Figure 12:
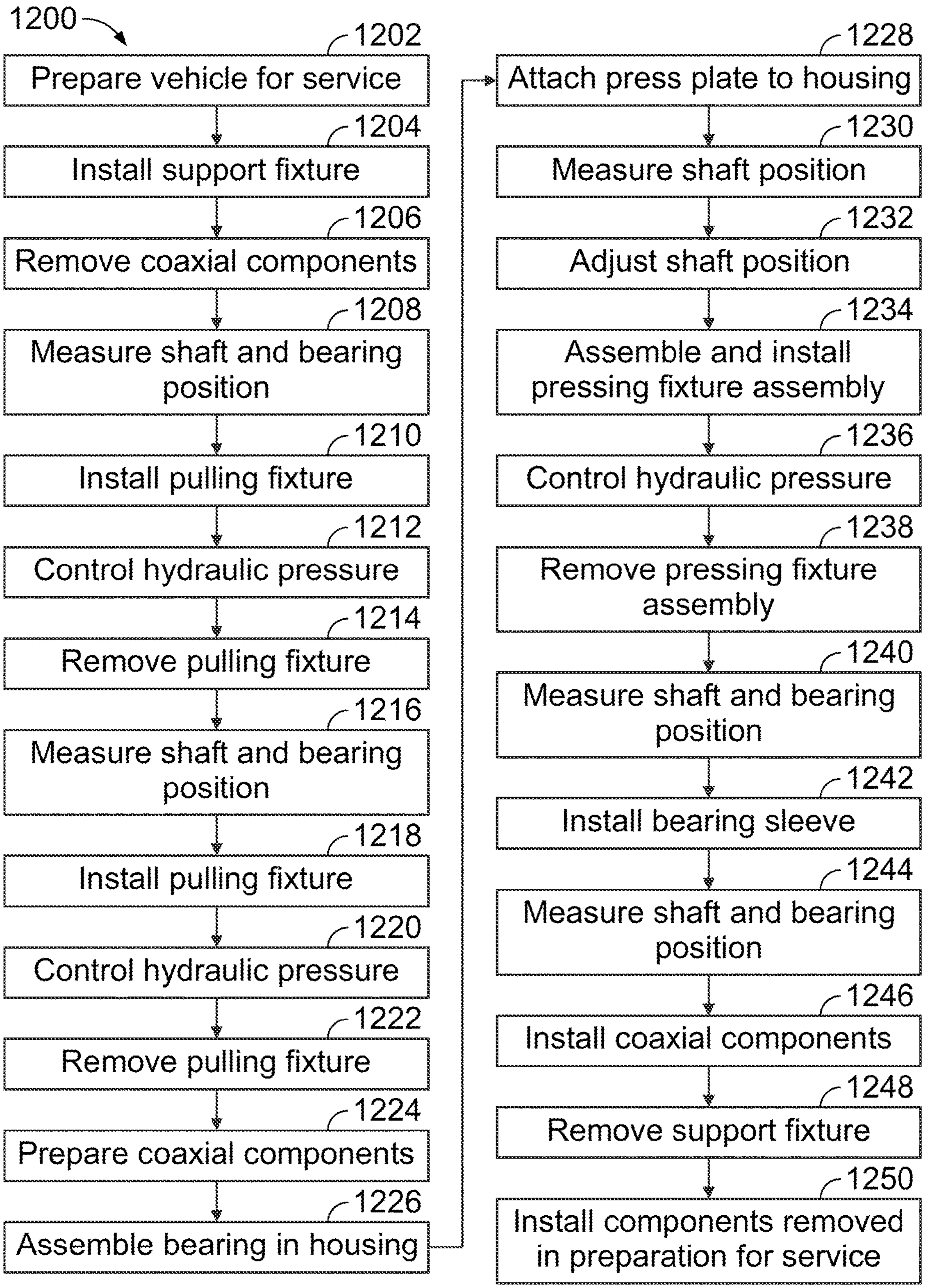
FIG. 12 is a flow chart of an assembly method used on a vehicle having horizontally mounted equipment.

Referring now to FIG. 12, for description purposes, a horizontally mounted alternator assembly is used as an illustrative example to describe a method 1200. The method can begin with a step 1202 of preparing the vehicle service. In one embodiment, a technician can disassemble all components that interfere with access to the equipment being serviced, for example brushes, brush holder assemblies, field cables, grease hoses, grease fittings, inlet ducting, or any other components.

The method proceeds to a step 1204 where the support fixture can be installed. For example, the technician can install the support fixture to the top of the front frame and the rear frame and couple the strap to the support fixture. The strap can be wrapped under the shaft in proximity to the collector rings and attach the eyebolt of the support fixture. The strap can be tensioned by way of rotating the eyebolt. The method can proceed to a step 1206 where the PTO hub can be unbolted from the end of the shaft and removed. The clamp plate can also be unbolted from the front frame and removed at the step 1206. The clamp plate may be heavy and should be lifted using a hoist. The step 1206 may include the bearing cap removal using jack-out bolts, for example, and an alignment pin to catch the bearing cap as it comes off of the front frame. The bearing cap may be heavy and should be lifted using a hoist. Used gasket material between the clamp plate and the front frame can be removed and discarded at the step 1206.

The method proceeds to a step 1208 where a number of measurements are taken using measuring equipment such as a dial indicator or calipers, for example. The measurements may include an axial measurement from the end of the shaft to the face of the bearing sleeve for use during reassembly.

The method proceeds to a step 1210 where the pulling fixture can be coupled to the bearing sleeve and the bearing housing using a hoist, for example. Coupling the pulling fixture can include bolting the flanged end to the front fram2. The method proceeds to a step 1212 where a hydraulic pressure can be controlled in the hydraulic ram to pull the bearing sleeve from the shaft. The method proceeds to a step 1214 where the pulling fixture may be removed. The method proceeds to a step 1216 where an axial measurement from the end of the shaft to the face of the bearing inner race can be recorded for use during reassembly. The strap may be adjusted to apply tension until the shaft moves vertically, as measured with a dial indicator, for example, in order to adjust the position of the shaft and confirm that the shaft is sufficiently supported by the strap prior to the removal of the bearing and the bearing housing. The method proceeds to a step 1218 where the pulling fixture may be coupled to the bearing housing. The plunger of the pulling fixture can be arranged to push on the end of the shaft. The method proceeds to a step 1220 where hydraulic pressure in the hydraulic ram is controlled. The technician can control the hydraulic pressure in the pulling fixture to perform the removal of the bearing and the bearing housing. The pulling fixture can be removed at a step 1222.

The method proceeds to a step 1224 where components are prepared for installation on to the shaft. New or repaired components such as bearings and gaskets can be prepared for reassembly, for example, by cleaning and packing with grease as necessary for proper operation. The method proceeds to a step 1226 where the bearing can be placed into the bearing housing. The method proceeds to a step 1228 where the press plate can be fastened to the bearing housing thereby securing the bearing within the bearing housing. The method proceeds to a step 1230 where the position of the shaft relative to the opening can be measured. The method proceeds to a step 1232 where adjustment to the position of the support fixture and the tension of the strap may be necessary to center the shaft in the opening.

The method proceeds to a step 1234 where the pressing fixture, the reaction ring, and the press plate are assembled and installed. In one embodiment, the reaction ring can be installed to the front frame in anticipation of the installation of new components. The press ring may be heavy and should be lifted using a hoist. The hydraulic ram can be assembled onto the pressing fixture, and the technician may pre-align the bearing and the bearing housing on the shaft. The method proceeds to a step 1236 where the hydraulic ram can be controlled to apply force to the bearing and the bearing housing for installation onto the shaft. At a step 1238, the press ring and the pressing fixture can be removed from the bearing housing and the front frame once the bearing and the bearing housing are positioned in the front frame and onto the shaft. The method proceeds to a step 1240 where axial measurements from the end of the shaft to the face of the bearing inner race can be recorded and compared to the measurements recorded during disassembly to confirm the bearing has fully seated.

The method proceeds to a step 1242 where the bearing sleeve may be heated, for example to 160 deg C., and installed onto the shaft. The bearing sleeve may be installed against the bearing inner race. It should be noted that the bearing sleeve may be continually rotated until it seizes to the shaft. The method proceeds to a step 1244 where axial measurements from the end of the shaft to the face of the bearing sleeve may be recorded and compared to the measurements recorded dung disassembly to confirm the bearing sleeve has fully sealed.

The method proceeds to a step 1246 where coaxial components removed in the step 1205 are installed. For example, once the bearing sleeve is installed, the hearing cap can be assembled and associated fasteners are torqued to the prescribed torque specification. Likewise, the clamp plate may be installed. In some embodiments, installing the clamp plate can include installing an inner bolt circle hardware first, rotating the assembly to align the outer bolt circle hardware and torquing the bolts to the prescribed torque specification. The PTO hub may be fastened to the shaft to the prescribed torque specifications.

The method proceeds to a step 1248 where the support fixture and the strap can be removed. The method proceeds to a step 1250 where components that were removed in the step 1202 in preparation for service can be reinstalled.

Provided herein is a method that includes coupling a support fixture having a hanging strap to a frame of an assembly at a location vertically above a rotatable shaft of the assembly; vertically supporting the shaft with the strap; temporarily mounting a pulling fixture to the frame of the assembly, the pulling fixture having a bowl-shaped body and a hydraulic ram coupled to the bowl-shaped body, the pulling fixture mounted to the frame such that a second end of the bowl-shaped body is coupled to the frame and the hydraulic ram is operably coupled to a bearing of the assembly; and controlling the hydraulic ram to apply coaxial force to the bearing to remove the bearing from the assembly or to install the bearing into the assembly. In some embodiments, the method further includes measuring a location of an end of the shaft with respect to the frame. In some embodiments, the method includes coupling a pressing fixture to the frame and coaxial with the shaft, the pressing fixture having a press ring, a press plate, and a hydraulic ram. In some embodiments, the method includes coupling a press cylinder to the hydraulic ram and the shaft. In some embodiments, the method includes coupling the press plate to the bearing. In some embodiments, the method includes coupling the pressing fixture to the frame and the press ring. In some embodiments, the method includes the step of actuating the hydraulic ram to apply a force on the press ring to remove the bearing, the force reacted by the press plate.

Provided herein is a support fixture for assembly of equipment having a horizontally arranged shaft disposed for rotation within a frame of a vehicle, the support fixture having a rectangular base having a length and a width, wherein the length is sized proportional to a diameter of the shaft, and wherein the width is sized proportional to a width of the frame; a first mounting bracket located at one end of the rectangular base; and an eyebolt mounted at an opposite of the rectangular based, wherein the eyebolt is threaded into the rectangular base. In some embodiments, the support fixture includes a flexible strap having a first end and a second end, the first end is coupled to the first mounting bracket, and the second end is coupled to the eyebolt. In some embodiments, the support fixture includes a hoist mount attached to the rectangular base between the first mounting bracket and the eyebolt. In some embodiments of the support fixture, the rectangular base is provided with at least one opening between the first mounting bracket and the eyebolt.

Provided herein is a pulling fixture for assembly of equipment having a horizontally arranged shaft disposed for rotation within a frame of a vehicle, the shaft supported in the frame on a bearing, the pulling fixture includes a bowl-shaped body having a flanged end and an opening opposite the flanged end; and a hydraulic ram coupled to the opening and aligned coaxially with the bowl-shaped body. In some embodiments, the hydraulic ram is operable coupled to the shaft. In some embodiments, the flanged end is operably coupled to the bearing. In some embodiments, the bowl-shaped body has an internal cavity sized to provide clearance to the shaft and bearing.

Provided herein is a pressing fixture assembly for assembly of equipment having a horizontally arranged shaft disposed for rotation within a frame of a vehicle, the shaft supported in the frame on a bearing, the pressing fixture assembly includes a press ring operably coupled to the frame; a press plate operably coupled to the bearing, the press plate positioned radially inward of the press ring; and a pressing fixture having a hydraulic ram and a plurality of arms extending from a hub coupled to the hydraulic ram. In some embodiments, the press ring is a generally annular ring having an inner periphery and an outer periphery, the annular ring having a plurality of radial extensions formed on the outer periphery. In some embodiments, each arm is provided with at least one slot, the slot adapted to couple to the extension of the press ring. In some embodiments, a press cylinder is coupled to the hydraulic ram, the press cylinder is located radially inward of the plurality of arms and located axially between the press plate and the hub. In some embodiments, the press cylinder has an opening larger than the shaft, and wherein the press cylinder is disposed radially around the shaft when coupled to the hydraulic ram.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:

coupling a support fixture having a hanging strap to a frame of an assembly at a location vertically above a rotatable shaft of the assembly;

vertically supporting the shaft with the strap;

temporarily mounting a pulling fixture to the frame of the assembly, the pulling fixture having a bowl-shaped body and a hydraulic ram coupled to the bowl-shaped body, the pulling fixture mounted to the frame such that a second end of the bowl-shaped body is coupled to the frame and the hydraulic ram is operably coupled to a bearing of the assembly; and controlling the hydraulic ram to apply coaxial force to the bearing to remove the bearing from the assembly or to install the bearing into the assembly.

2. The method of claim 1, further comprising:

measuring a location of an end of the shaft with respect to the frame.

3. The method of claim 2, further comprising:

coupling a pressing fixture to the frame and coaxial with the shaft, the pressing fixture having a press ring, a press plate, and a hydraulic ram.

4. The method of claim 3, further comprising coupling a press cylinder to the hydraulic ram and the shaft.

5. The method of claim 4, further comprising coupling the press plate to the bearing.

6. The method of claim 5, further comprising coupling the pressing fixture to the frame and the press ring.

7. The method of claim 6, further comprising the step of actuating the hydraulic ram to apply a force on the press ring to remove the bearing, the force reacted by the press plate.

* * * * *